(12) United States Patent
Sadil

(10) Patent No.: US 10,487,687 B1
(45) Date of Patent: Nov. 26, 2019

(54) GAS TURBINE ENGINE HAVING A SEAL DAMPER ASSEMBLY

(71) Applicant: United Technologies Corporation, Farmington, CT (US)

(72) Inventor: Andreas Sadil, Newington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 448 days.

(21) Appl. No.: 15/266,536

(22) Filed: Sep. 15, 2016

(51) Int. Cl.
*F01D 25/04* (2006.01)
*F02C 3/04* (2006.01)
*F01D 25/26* (2006.01)
*F02C 7/28* (2006.01)

(52) U.S. Cl.
CPC ............ *F01D 25/04* (2013.01); *F01D 25/26* (2013.01); *F02C 3/04* (2013.01); *F02C 7/28* (2013.01); *F05D 2220/32* (2013.01); *F05D 2240/35* (2013.01); *F05D 2260/52* (2013.01)

(58) Field of Classification Search
CPC .. F01D 25/04; F01D 25/26; F02C 3/04; F02C 7/28; F05D 2220/32; F05D 2240/35; F05D 2260/52
See application file for complete search history.

(56) References Cited

U.S. PATENT DOCUMENTS

| 854,238 | A | * | 5/1907 | Rielly | ..................... B60B 9/26 |
| | | | | | 152/69 |
| 3,253,836 | A | | 5/1966 | Hamm | |
| 4,207,957 | A | * | 6/1980 | Sivers | ..................... B60K 17/22 |
| | | | | | 180/380 |
| 4,590,964 | A | * | 5/1986 | Beardmore | .............. B67D 7/68 |
| | | | | | 137/565.24 |
| 4,989,886 | A | * | 2/1991 | Rulis | ....................... F01D 11/00 |
| | | | | | 277/355 |
| 5,066,025 | A | * | 11/1991 | Hanrahan | ............ F16J 15/3288 |
| | | | | | 277/355 |
| 5,090,710 | A | * | 2/1992 | Flower | ................. F16J 15/3288 |
| | | | | | 277/355 |
| 5,192,185 | A | * | 3/1993 | Leonard | .................. F01D 11/08 |
| | | | | | 415/170.1 |
| 5,474,305 | A | * | 12/1995 | Flower | ................. F16J 15/3288 |
| | | | | | 277/355 |
| 6,079,945 | A | * | 6/2000 | Wolfe | ................... F01D 11/005 |
| | | | | | 277/355 |

(Continued)

FOREIGN PATENT DOCUMENTS

| DE | 102014115843 A1 | 5/2015 |
| EP | 3012497 A1 | 4/2016 |

OTHER PUBLICATIONS

European Search Report for European Patent Application No. 17181282.9 dated Mar. 28, 2018, 7 pages.

*Primary Examiner* — Jesse S Bogue
(74) *Attorney, Agent, or Firm* — Cantor Colburn LLP

(57) ABSTRACT

A seal damper assembly includes a seal housing, a sliding seal, and a damping member. The seal housing is disposed on a case assembly that is disposed about an engine component. The seal housing has a base and a wall that axially extends from the base. The base and the wall define a cavity. The sliding seal is received within the cavity. The damping member is received within the cavity and is disposed between the wall and the sliding seal.

20 Claims, 3 Drawing Sheets

(56) References Cited

U.S. PATENT DOCUMENTS

| | | | | |
|---|---|---|---|---|
| 6,102,610 | A * | 8/2000 | Palusis | F02K 1/80 |
| | | | | 403/179 |
| 6,669,203 | B1 * | 12/2003 | Mortzheim | F16J 15/3288 |
| | | | | 277/355 |
| 6,918,739 | B2 * | 7/2005 | Addis | F01D 11/00 |
| | | | | 277/355 |
| 8,047,008 | B2 * | 11/2011 | Lebegue | F01D 9/023 |
| | | | | 60/752 |
| 8,505,923 | B2 * | 8/2013 | Ferryman | F28D 19/047 |
| | | | | 277/355 |
| 8,657,298 | B2 * | 2/2014 | Zheng | F16J 15/3288 |
| | | | | 277/355 |
| 8,672,302 | B2 * | 3/2014 | Borgen | F16F 3/02 |
| | | | | 267/136 |
| 8,727,354 | B2 * | 5/2014 | Addis | F16J 15/3288 |
| | | | | 277/355 |
| 10,119,474 | B2 * | 11/2018 | Hyland | F01D 19/00 |
| 2003/0202876 | A1 * | 10/2003 | Jasklowski | F01D 11/025 |
| | | | | 415/135 |
| 2011/0121519 | A1 * | 5/2011 | Justak | F01D 11/025 |
| | | | | 277/412 |
| 2015/0104123 | A1 | 4/2015 | Ertas et al. | |
| 2015/0285152 | A1 * | 10/2015 | Hayford | F02C 7/28 |
| | | | | 415/171.1 |
| 2016/0186588 | A1 | 1/2016 | Davis et al. | |
| 2016/0326905 | A1 * | 11/2016 | Zhang | F16L 55/0335 |

* cited by examiner

GAS TURBINE ENGINE HAVING A SEAL DAMPER ASSEMBLY

STATEMENT OF FEDERAL SUPPORT

This invention was made with government support under Contract No. F33657-91-C-007 awarded by the United States Air Force. The government has certain rights in the invention.

BACKGROUND

Gas turbine engines may be provided an injection assembly that is arranged within the gas turbine engine. The injection assembly may be subject to dimensional variation, structural deflection, thermal growth, or vibration during operation of the gas turbine engine. The movement or displacement of the injection assembly may cause wear at mounting interfaces of the injection assembly, reduce part life, or lead to non-uniform performance of the injection assembly.

Accordingly, it is desirable to reduce high cycle fatigue vibration to reduce wear and extend life of injection assembly components.

BRIEF DESCRIPTION

According to an embodiment of the present disclosure, a seal damper assembly is provided. The seal damper assembly is provided with a gas turbine engine. The seal damper assembly includes a seal housing, a sliding seal, and a damping member. The seal housing is disposed on a case assembly that is disposed about an engine component. The seal housing has a base and a wall that axially extends from the base. The base and the wall define a cavity. The sliding seal is received within the cavity. The damping member is received within the cavity and is disposed between the wall and the sliding seal.

In addition to one or more of the features described above, or as an alternative to any of the foregoing embodiments, the wall of the seal housing defines a recess that extends from an interior surface of the wall towards an exterior surface of the wall.

In addition to one or more of the features described above, or as an alternative to any of the foregoing embodiments, the sliding seal has an inner face, an outer face that is radially spaced apart from the inner face, a first face, and a second face disposed opposite the first face, each of the inner face and the outer face axially extends between the first face and the second face.

In addition to one or more of the features described above, or as an alternative to any of the foregoing embodiments, the sliding seal is disposed on the base.

In addition to one or more of the features described above, or as an alternative to any of the foregoing embodiments, the damping member is configured to engage the outer face of the sliding seal and the interior surface of the wall.

In addition to one or more of the features described above, or as an alternative to any of the foregoing embodiments, a retainer that is at least partially received within the recess and radially extends towards the inner face of the sliding seal.

In addition to one or more of the features described above, or as an alternative to any of the foregoing embodiments, the retainer is configured to engage the second face of the sliding seal to retain the sliding seal within the cavity of the seal housing.

According to another embodiment of the present disclosure, a seal damper assembly is provided. The seal damper assembly includes a seal housing, a mounting member, a sliding seal, and a damping member. The seal housing has an annularly extending wall and a base defining an opening. The mounting member is connected to the annularly extending wall. The mounting member extends radially inward towards the opening. The sliding seal is disposed concentrically with and is spaced apart from the annularly extending wall. The damping member is disposed about the sliding seal and is operatively connected to the mounting member.

In addition to one or more of the features described above, or as an alternative to any of the foregoing embodiments, the mounting member is configured as at least one of a hook, a tab, and an eyelet.

In addition to one or more of the features described above, or as an alternative to any of the foregoing embodiments, the damping member includes a first portion that is connected to the mounting member, a second portion that engages an outer surface of the sliding seal, and an extension portion that extends between the first portion and the second portion.

In addition to one or more of the features described above, or as an alternative to any of the foregoing embodiments, the damping member is configured as a wire rope isolator.

In addition to one or more of the features described above, or as an alternative to any of the foregoing embodiments, the damping member is configured as a sheet metal spring.

In addition to one or more of the features described above, or as an alternative to any of the foregoing embodiments, an engine component at least partially extends through the opening.

According to yet another embodiment of the present disclosure, a gas turbine engine is provided. The gas turbine engine includes an inner case, an outer case, and a seal damper assembly. The inner case is disposed about a compressor section, a combustor section, and a turbine section. The outer case is disposed about the inner case. The seal damper assembly is disposed about an engine component that extends through at least one of the inner case and the outer case. The seal damper assembly is configured to dampen displacement of the engine component. The seal damper assembly includes a seal housing, a sliding seal, and a damping member. The seal housing has a base and a wall axially extending from the base. The base and the wall define a cavity. The sliding seal is disposed within the cavity. The damping member is disposed within the cavity and is disposed between the wall and the sliding seal.

In addition to one or more of the features described above, or as an alternative to any of the foregoing embodiments, the sliding seal has a first face that is disposed opposite a second face, the first face being configured to engage the base.

In addition to one or more of the features described above, or as an alternative to any of the foregoing embodiments, the first face and the second face each radially extend between an inner face and an outer face, the outer face being configured to engage the damping member.

In addition to one or more of the features described above, or as an alternative to any of the foregoing embodiments, the inner face of the sliding seal defines an opening through which the engine component extends.

In addition to one or more of the features described above, or as an alternative to any of the foregoing embodiments, the damping member is configured as a sheet metal spring.

In addition to one or more of the features described above, or as an alternative to any of the foregoing embodiments, the damping member is operatively connected to a mounting member connected to the wall.

In addition to one or more of the features described above, or as an alternative to any of the foregoing embodiments, the damping member is configured as a wire damper.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
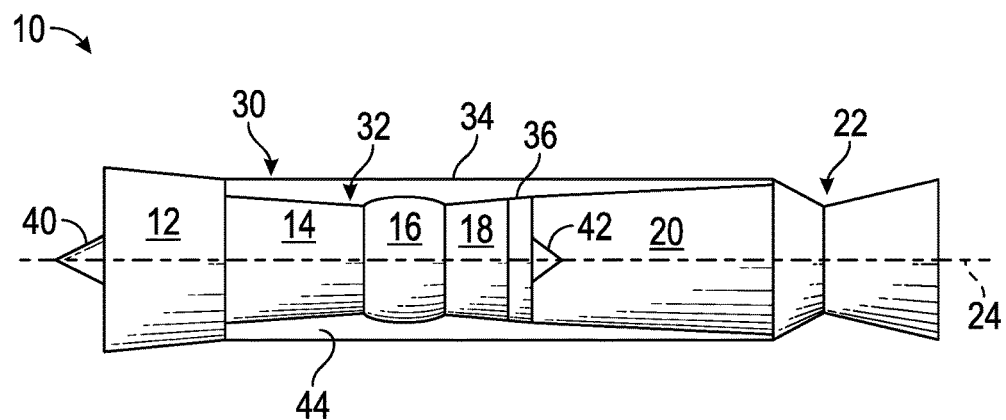
FIG. 1 is a schematic view of a gas turbine engine having augmentor assembly.

Referring to FIG. 1 a schematic view of a gas turbine engine 10 is shown. The gas turbine engine 10 includes a fan section 12, a compressor section 14, a combustor section 16, a turbine section 18, an augmentor assembly 20, and a nozzle assembly 22 that are sequentially arranged along an engine axis 24, and a seal damper assembly 26. The fan section 12, the compressor section 14, and the turbine section 18 are rotatable about the engine axis 24.

A case assembly 30 is disposed about various components of the gas turbine engine 10. The case assembly 30 includes an inner case 32 disposed within an outer case 34. The inner case 32 is disposed about a core of the gas turbine engine that comprises the compressor section 14, the combustor section 16, the turbine section 18, and the augmentor assembly 20. The inner case 32 extends from an aft end of the fan section 12 towards a fore end of the nozzle assembly 22. The inner case 32 may define a trailing edge box 36 that extends from a portion of the inner case 32 disposed proximate an aft end of the turbine section 18 to a portion of the inner case 32 disposed proximate a fore end of the augmentor assembly 20.

The outer case 34 is disposed about the inner case 32. The outer case 34 extends from an aft end of the fan section 12 to a fore end of the nozzle assembly 22. In at least one embodiment, the outer case 34 extends from a fore end of the fan section 12 to the fore end of the nozzle assembly 22.

Air entering the fan section 12 flows over a nose cone 40 and may flow through the core of the gas turbine engine 10 or may bypass the core of the gas turbine engine 10. Air that flows through the core of the gas turbine engine 10 exits the core through a region defined between a tail cone 42 and the trailing edge box 36. The trailing edge box 36 is disposed about the tail cone 42. The tail cone 42 extends from the turbine section 18 towards the nozzle assembly 22.

Air that may bypass the core of the gas turbine engine 10 may flow through a bypass duct 44 that is defined between the inner case 32 and the outer case 34. Air that flows through the core of the gas turbine engine 10 and air that bypasses the core of the gas turbine engine 10 through the bypass duct 44 merge or meet at or proximate the nozzle assembly 22. The nozzle assembly 22 may be a configured as a converging diverging nozzle assembly.

The augmentor assembly 20 extends axially from the trailing edge box 36 or directly from the turbine section 18 towards the nozzle assembly. The augmentor assembly 20 extends radially outward towards the outer case 34 of the case assembly 30. The augmentor assembly 20 is configured to inject fuel or other another fluid to augment or adjust the thrust of the gas turbine engine 10. engine component 50

Figure 2:
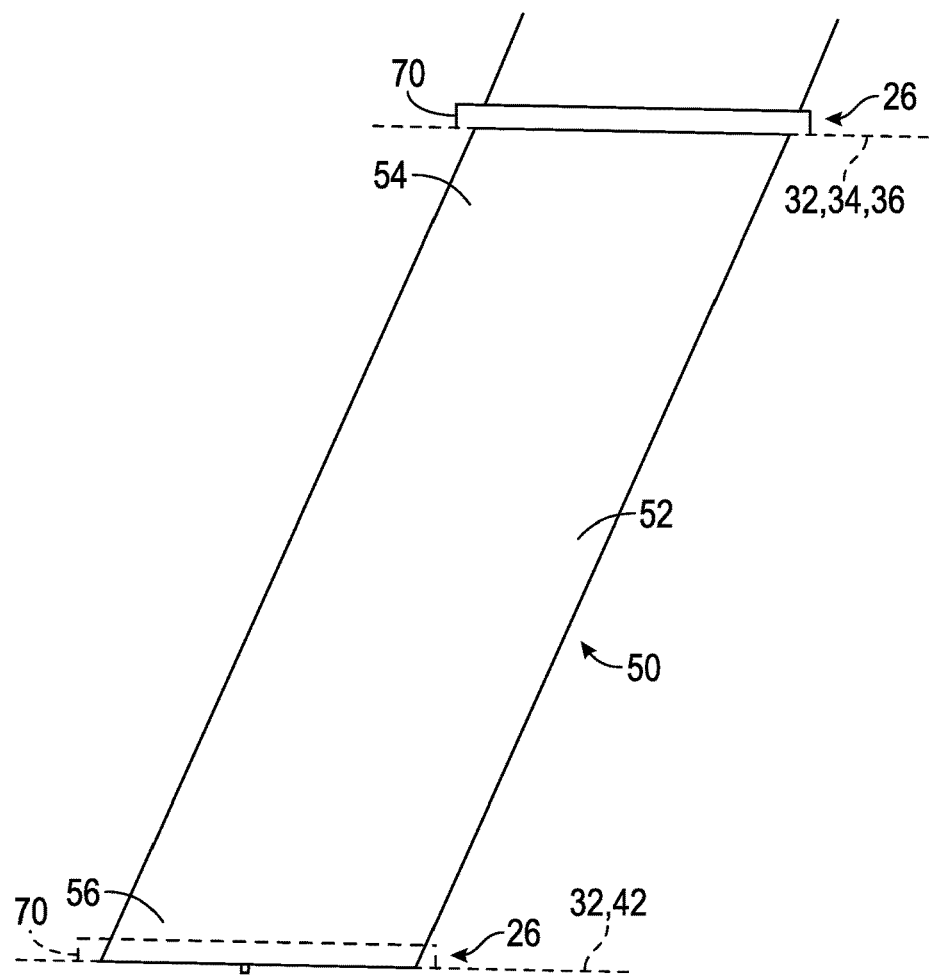
FIG. 2 is a side view of a spray bar of the augmentor assembly.
Figure 3:
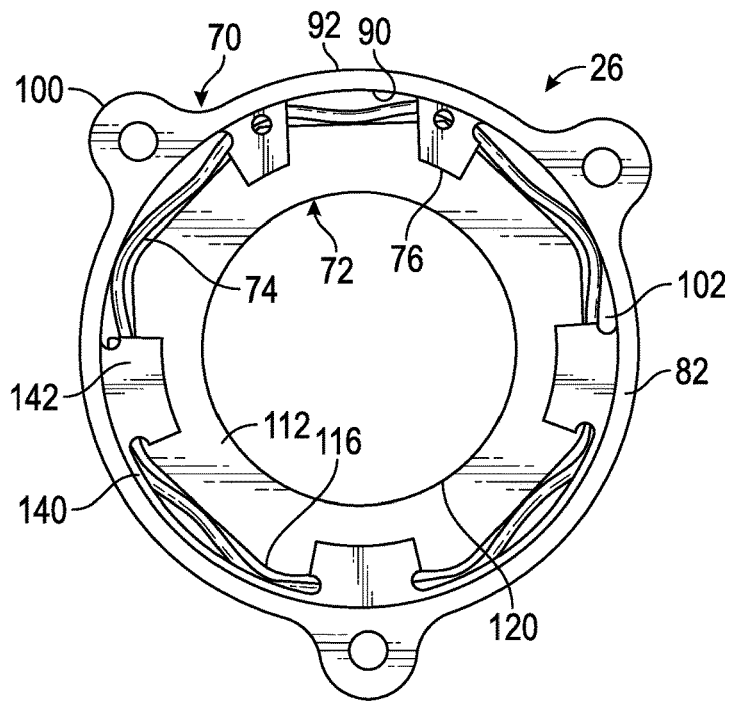
FIG. 3 is an interior view of a seal damper assembly of the augmentor assembly.
Figure 4:
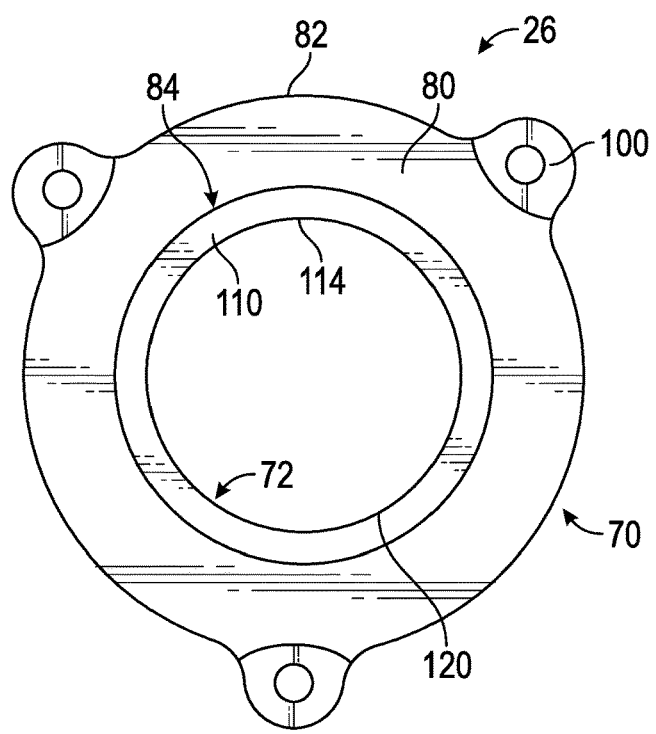
FIG. 4 is an exterior view of the seal damper assembly of the augmentor assembly.
Figure 5:
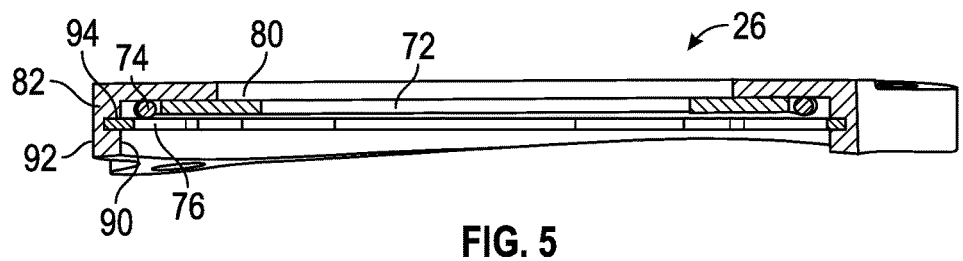
FIG. 5 is a partial end view of the seal damper assembly of the augmentor assembly.
Figure 6:
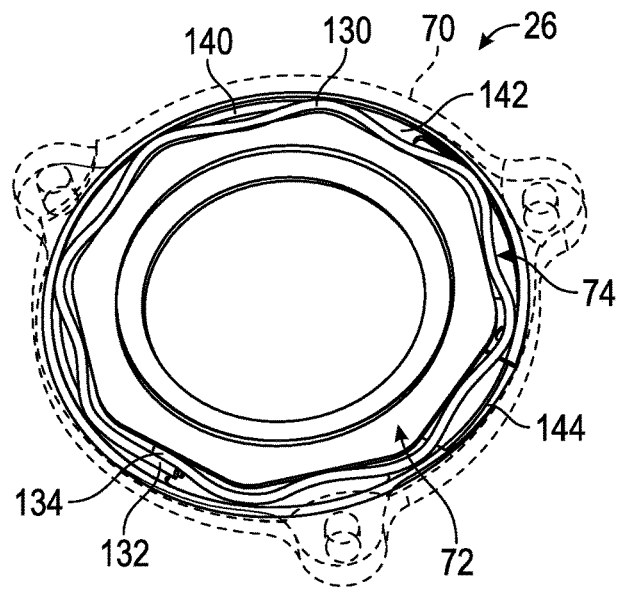
FIG. 6 is another interior view of the seal damper assembly of the augmentor assembly.

Referring to FIG. 2, an engine component 50 such as a spray bar, a fuel line, a spray nozzle, a probe, a sensor, a tube, a supply line, a return line, or the like may extend through at least one of the inner case 32 and the outer case 34. The engine component 50 may extend through the outer case 34 and the inner case 32 and extend into the core of the gas turbine engine 10. The engine component 50 may extend between the tail cone 42 and the trailing edge box 36.

The engine component 50 has an engine component body 52 that extends between a first end 54 and a second end 56. The first end 54 that is operatively connected to the inner case 32, the outer case 34, or the trailing edge box 36. The engine component 50 has a second end 56 that is disposed opposite the first end 54 and is operatively connected to the inner case 32 or the tail cone 42. In at least one embodiment, the second end 56 extends into the core of the gas turbine engine 10 and is not operatively connected to the inner case 32 or the tail cone 42.

The engine component 50 may displace, oscillate, vibrate, or the like during operation of the gas turbine engine 10 and the seal damper assembly 26 is provided to dampen or reduce the displacement, oscillation, or vibrations of the engine component 50. The seal damper assembly 26 is disposed on and is operatively connected to a portion of the fan section 12, the turbine section 18, the augmentor assembly 20, the nozzle assembly 22, the inner case 32, the outer case 34, the trailing edge box 36, the nose cone 40, or the tail cone 42. In at least one embodiment, the seal damper assembly 26 is disposed within a portion of the fan section 12, the turbine section 18, the augmentor assembly 20, the nozzle assembly 22, the inner case 32, the outer case 34, the trailing edge box 36, the nose cone 40, or the tail cone 42.

The seal damper assembly 26 may be disposed about the engine component body 52 proximate the first end 54, the second end 56, or between the first end 54 and the second end 56. The seal damper assembly 26 includes a seal housing 70, a sliding seal 72, a damping member 74, and a retainer 76. The seal housing 70 may be disposed on or within the inner case 32, the outer case 34, the trailing edge box 36, the tail cone 42, or the like. The seal housing 70 may be disposed about the engine component 50.

Referring to FIGS. 3-6, the seal housing 70 has a base 80 and a wall 82 axially extending from the base 80. The base 80 defines a central opening 84 that is disposed radially inward from the wall 82. The central opening 84 is disposed concentrically with the wall 82.

The wall 82 includes an interior surface 90 and an exterior surface 92 that is disposed opposite the interior surface 90. The wall 82 defines a recess 94 that extends from the interior surface 90 towards the exterior surface 92. The recess 94 does not extend completely through the wall 82.

The wall 82 further includes a mounting lug 100 that extends radially outward from the exterior surface 92. The mounting lug 100 is configured to receive a fastener to couple the seal damper assembly 26 to at least one of the engine component 50 and the trailing edge box 36.

The base 80 and the wall 82 define a cavity 102. The cavity 102 is configured to receive the sliding seal 72.

The sliding seal 72 is disposed on the base 80 and is disposed concentrically with the wall 82. The sliding seal 72 is disposed concentrically with the central opening 84 of the base 80. The sliding seal 72 is configured to move or slide relative to the seal housing 70 in response to movement of the engine component 50. The sliding seal 72 includes a first face 110, a second face 112, an inner face 114, and an outer face 116.

The first face 110 is configured to engage the base 80. The second face 112 is disposed opposite the first face 110. The first face 110 and the second face 112 radially extend between the inner face 114 and the outer face 116.

The inner face 114 and the outer face 116 axially extend between the first face 110 and the second face 112. The inner face 114 defines an opening 120 that is disposed concentrically with the central opening 84 of the base 80 of the seal housing 70. The inner face 114 may have a generally arcuate shape or configuration. The engine component 50 extends through the opening 120 of the sliding seal 72 and the central opening 84 of the seal housing 70. The outer face 116 faces towards the interior surface 90 of the wall 82 of the seal housing 70. The outer face 116 may have a non-arcuate shape or configuration but may include a plurality of flat faces. In at least one embodiment, the outer face 116 includes a plurality of facets such that the plurality of facets provides the sliding seal 72 with an octagonal shape.

The damping member 74 is received within the cavity 102 defined by the base 80 and the wall 82 of the seal housing 70. The damping member 74 is configured to engage the base 80 and the wall 82 of the seal housing 70 and the sliding seal 72. The damping member 74 is disposed between the wall 82 of the seal housing 70 and the outer face 116 of the sliding seal 72. The damping member 74 is configured to engage the interior surface 90 of the wall 82 of the seal housing 70 and the outer face 116 of the sliding seal 72.

The damping member 74 is configured as a wire rope isolator, a wire damper, a sheet metal spring, an annular sheet metal spring, or the like. The damping member 74 is configured to absorb shock, vibration, oscillation, or displacement of the engine component 50. In at least one embodiment, the damping member 74 is configured to dampen relative movement between the seal housing 70 and the sliding seal 72 as a result of movement of the engine component 50.

The damping member 74 includes a damping member body 130 that extends between a first damping member end 132 and a second damping member end 134. The first damping member end 132 at least partially overlaps the second damping member end 134. The at least partial overlapping of the first damping member end 132 and the second damping member end 134 aids in biasing the damping member 74 radially outward towards the interior surface 90 of the wall 82 of the seal housing 70.

The retainer 76 is at least partially received within the recess 94 defined by the wall 82 of the seal housing 70. The retainer 76 is configured as an arcuate ring 140 having a tab 142. The arcuate ring 140 defines a break 144 such that the arcuate ring 140 does not form a continuous ring. The break 144 is disposed between opposing ends of the arcuate ring 140 that are spaced apart from each other.

The tab 142 extends radially inward from the arcuate ring 140. The tab 142 extends towards the inner face 114 of the sliding seal 72. The tab 142 of the retainer 76 is configured to engage the second face 112 of the sliding seal 72 and at least a portion of the damping member 74 to retain the sliding seal 72 and the damping member 74 within the cavity 102 of the seal housing 70.

Figure 7:
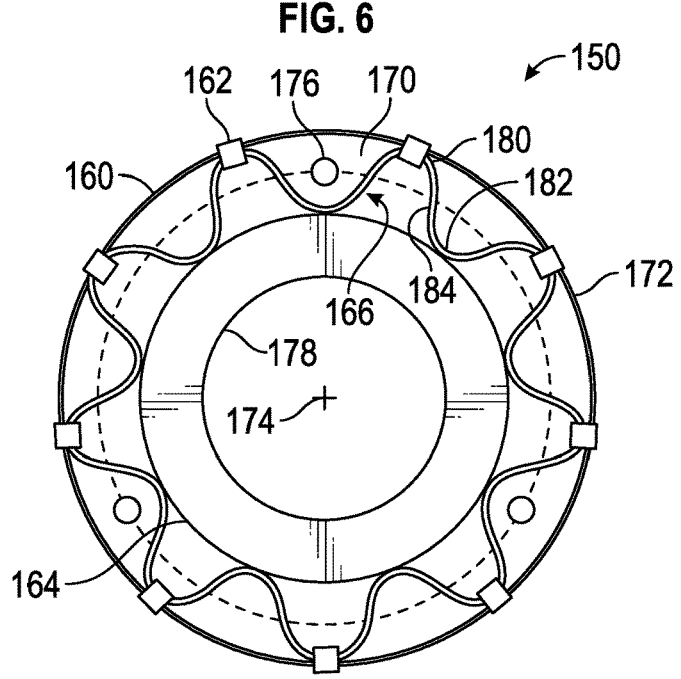
FIG. 7 is a partial perspective view of another embodiment of the seal damper assembly of the augmentor assembly.

Referring to FIG. 7, a second embodiment of a seal damper assembly 150 is shown. The seal damper assembly 150 is configured to be operatively connected to the augmentor assembly 20 or the trailing edge box 36. The seal damper assembly 150 includes a seal housing 160, a mounting member 162, a sliding seal 164, and a damping member 166.

The seal housing 160 has a base 170 and an annularly extending wall 172. The base 170 extends radially inward towards a centerline 174 of the seal housing 160. The base 170 defines a mounting hole 176 that is configured to receive a fastener to connect the seal housing 160 of the seal damper assembly 150 to the trailing edge box 36. The base 170 defines an opening 178 through which an engine component 50 at least partially extends.

The annularly extending wall 172 extends axially from the base 170. The mounting member 162 is connected to the annularly extending wall 172. The mounting member 162 extends radially inwardly towards the centerline 174 of the seal housing 160. The mounting member 162 is configured as a hook, a tab, a member having an eyelet, or the like.

The sliding seal 164 is spaced apart from and is disposed concentrically with the annularly extending wall 172. The sliding seal 164 is disposed on the base 170 and is spaced apart from the mounting hole 176 defined by the base 170.

The damping member 166 is disposed about the sliding seal 164 and is disposed concentrically with the annularly extending wall 172. The damping member 166 includes a first portion 180, a second portion 182, and an extension portion 184. The first portion 180 is connected to the mounting member 162. In at least one embodiment, the first portion 180 extends through or is secured to the mounting member 162. The first portion 180 is configured to engage the annularly extending wall 172. The second portion 182 is configured to engage an outer surface of the sliding seal 164. The extension portion 184 extends between the first portion 180 and the second portion 182.

The damping member 166 is configured as a wire rope isolator, a wire damper, a sheet metal spring, an annular sheet metal spring, or the like. The damping member 166 is configured to absorb shock, vibration, oscillation, or displacement of a spray bar that is operatively connected to the seal damper assembly 150. In at least one embodiment, the damping member 166 is configured to dampen relative movement between the seal housing 160 and the sliding seal 164 as a result of movement of the spray bar that is operatively connected to the seal damper assembly 150.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A seal damper assembly provided with a gas turbine engine, comprising: a seal housing disposed on a case assembly that is disposed about an engine component, the seal housing having a base defining an opening, and a wall extending from the base axially along the seal housing, the base and the wall defining a cavity; a plurality of mounting members connected to the wall, each of the plurality of mounting members extending inward radially towards the opening; a sliding seal that is received within the cavity and has a dimension extending in an axial direction that is less than a radial width of the sliding seal; and a damping member that is received within the cavity and is disposed between the wall and the sliding seal, the damping member being connected to each of the plurality of mounting members.

2. The seal damper assembly of claim 1, wherein the wall of the seal housing defines a recess that extends from an interior surface of the wall towards an exterior surface of the wall.

3. The seal damper assembly of claim 2, wherein the sliding seal has an inner face, an outer face that is spaced apart radially from the inner face, a first face, and a second face disposed opposite the first face, each of the inner face and the outer face extending axially between the first face and the second face.

4. The seal damper assembly of claim 3, wherein the sliding seal is disposed on the base.

5. The seal damper assembly of claim 4, wherein the damping member is configured to engage the outer face of the sliding seal and the interior surface of the wall.

6. The seal damper assembly of claim 4 further comprising a retainer that is at least partially received within the recess and extends radially towards the inner face of the sliding seal.

7. The seal damper assembly of claim 6, wherein the retainer is configured to engage the second face of the sliding seal to retain the sliding seal within the cavity of the seal housing.

8. A seal damper assembly, comprising:
a seal housing having a wall extending from a base annularly, the base defining an opening, the seal housing defining a central axis;
a plurality of mounting members connected to the wall, each of the plurality of mounting members extending inward radially towards the opening, defining a damper aperture, and being disposed equidistant from the central axis;
a sliding seal disposed concentrically with and spaced apart from the wall, the sliding seal having a dimension extending in an axial direction that is less than a radial width; and
a damping member extending about the sliding seal and operatively connected to each of the plurality of mounting members.

9. The seal damper assembly of claim 8, wherein each of the plurality of mounting members is configured as at least one of a hook, a tab, and an eyelet.

10. The seal damper assembly of claim 8, wherein the damping member includes a first portion that is connected to each of the plurality of mounting members, a second portion that engages an outer surface of the sliding seal, and an extension portion that extends between the first portion and the second portion.

11. The seal damper assembly of claim 8, wherein the damping member is configured as a wire rope isolator.

12. The seal damper assembly of claim 8, wherein the damping member is configured as a sheet metal spring.

13. The seal damper assembly of claim 8, wherein an engine component at least partially extends through the opening.

14. A gas turbine engine, comprising: an inner case disposed about a compressor section, a combustor section, and a turbine section, the inner case defining a central axis: an outer case disposed about the inner case; and a seal damper assembly disposed about an engine component that extends through at least one of the inner case and the outer case, the seal damper assembly being configured to dampen displacement of the engine component, the seal damper assembly comprising: a seal housing having a base defining an opening and a wall extending from the base axially along the seal housing, the base and the wall defining a cavity, the seal housing further having a plurality of mounting members connected to the wall, each of the plurality of mounting members extending inward radially towards the opening; a sliding seal that is disposed within the cavity and has a dimension extending in an axial direction that is less than a radial width of the sliding seal; and a damping member that is disposed within the cavity and is disposed between the wall and the sliding seal and operatively connected to each of the plurality of mounting members.

15. The gas turbine engine of claim 14, wherein the sliding seal has a first face that is disposed opposite a second face, the first face being configured to engage the base.

16. The gas turbine engine of claim 15, wherein the first face and the second face each extend radially between an inner face and an outer face, the outer face being configured to engage the damping member.

17. The gas turbine engine of claim 16, wherein the inner face of the sliding seal further defines the opening through which the engine component extends.

18. The gas turbine engine of claim 17, wherein the damping member is configured as a sheet metal spring.

19. The gas turbine engine of claim 14, wherein the damping member is operatively connected to each of the plurality of mounting members, each of the plurality of mounting members being connected to the wall.

20. The gas turbine engine of claim 19, wherein the damping member is configured as a wire damper.

* * * * *